US012762734B2

(12) United States Patent
Marche et al.

(10) Patent No.: US 12,762,734 B2
(45) Date of Patent: Oct. 13, 2026

(54) SYSTEM AND METHOD FOR DETECTING THE POSITIONING OF A PERSON RELATIVE TO A SEAT

(71) Applicant: HONEYWELL INTERNATIONAL s.r.o., Prague (CZ)

(72) Inventors: Stephane Marche, Toulouse (FR); Hicham Atassi, Brno (CZ)

(73) Assignee: Honeywell Aerospace US LLC, Phoenix, AZ (US)

( * ) Notice: Subject to any disclaimer, the term of this patent is extended or adjusted under 35 U.S.C. 154(b) by 574 days.

(21) Appl. No.: 18/339,463

(22) Filed: Jun. 22, 2023

(65) Prior Publication Data

US 2024/0428447 A1 Dec. 26, 2024

(51) Int. Cl.

*G06T 7/73* (2017.01)
*G06T 7/246* (2017.01)
*G08B 21/22* (2006.01)

(52) U.S. Cl.

CPC ................ *G06T 7/74* (2017.01); *G06T 7/248* (2017.01); *G08B 21/22* (2013.01); *G06T 2207/30196* (2013.01)

(58) Field of Classification Search

CPC .. G06T 7/248; G06T 7/74; G06T 7/10; G06T 2207/10016; G06T 2207/30244; G06T 2207/30252; G06V 20/70; G06V 20/58; G06V 2201/08; G01P 13/00

See application file for complete search history.

(56) References Cited

U.S. PATENT DOCUMENTS

| | | | | |
|---|---|---|---|---|
| 8,213,686 B2 * | 7/2012 | Hildreth | G06V 10/17 | 348/208.1 |
| 2008/0065291 A1 * | 3/2008 | Breed | G08B 21/22 | 382/190 |
| 2008/0069403 A1 | 3/2008 | Breed | | |
| 2017/0046582 A1 | 2/2017 | Hoshiya | | |
| 2017/0116489 A1 | 4/2017 | Porsch | | |
| 2020/0027236 A1 * | 1/2020 | Tamama | G06F 3/0346 | |
| 2020/0065595 A1 * | 2/2020 | Hyuga | G06V 40/166 | |
| 2021/0158064 A1 * | 5/2021 | Banno | B60W 30/14 | |
| 2022/0084316 A1 | 3/2022 | Wang et al. | | |

(Continued)

FOREIGN PATENT DOCUMENTS

| | | |
|---|---|---|
| DE | 102006040244 B3 | 8/2007 |
| DE | 102009000740 A1 | 8/2010 |
| DE | 102021206235 A1 | 12/2021 |

(Continued)

*Primary Examiner* — Pinalben Patel
(74) *Attorney, Agent, or Firm* — Ingrassia Fisher & Lorenz

(57) ABSTRACT

A system and method to detect the positioning of a person relative to a seat includes an image sensor and a processing system. The image sensor is directed toward the seat and is configured to capture images of the person and the seat and to supply image data indicative of the captured images. The processing system is in operable communication with the image sensor and is configured to receive and process the image data to determine when the person is not in a first position by determining that the image sensor is not focused on the person for a first predetermined time period, based on which of a plurality of objects on the seat are visible in the captured images, and/or by variations in the illumination pattern emitted onto the person.

11 Claims, 7 Drawing Sheets

(56) References Cited

U.S. PATENT DOCUMENTS

| | | | |
|---|---|---|---|
| 2022/0230522 | A1 | 7/2022 | Myers |

FOREIGN PATENT DOCUMENTS

| | | | |
|---|---|---|---|
| DE | 102021202123 | A1 | 9/2022 |
| DE | 102022106434 | A1 | 9/2022 |
| JP | 6627787 | B2 | 1/2020 |
| KR | 102485325 | B1 | 1/2023 |

* cited by examiner

SYSTEM AND METHOD FOR DETECTING THE POSITIONING OF A PERSON RELATIVE TO A SEAT

STATEMENT REGARDING FEDERALLY SPONSORED RESEARCH OR DEVELOPMENT

The project leading to this application has received funding from the Clean Sky 2 Joint Undertaking (JU) under grant agreement No 945583. The JU receives support from the European Union's Horizon 2020 research and innovation programme and the Clean Sky 2 JU members other than the Union.

TECHNICAL FIELD

The present disclosure relates to detecting the state of person, such as a vehicle driver, airline pilot, and/or system/plant operator, and more particularly to systems and methods for detecting the positioning of a person relative to a seat.

BACKGROUND

There are numerous environments in which a single operator is responsible for control of a system. For example, most motor vehicles include a single operator (i.e., driver) and many industrial and power plants include single operators for monitoring various process statuses. In the aviation context, there are times when a single operator (i.e., pilot) is responsible for control of the aircraft. For example, many general (i.e., non-commercial) aircraft rely on a single pilot. For commercial flight, consideration is being given to implementing extended Minimum Crew Operations (eMCO) or Reduced Crew Operations (RCO), for which a single pilot is on duty during the cruise phase of flight. Moreover, it is proposed that, perhaps in the impending the urban air mobility environment, a single pilot may be used.

No matter the specific environment, it is desirable to be able to determine if the single operator is either incapacitated or at least not sufficiently vigilant to ensure a proper level of system operation. To date, most solutions have focused on fairly complex systems and methods, such as artificial intelligence and machine learning. While these systems and methods are generally robust, they can result in an inordinate number of false-negative detections.

Hence, there is a need for a system and method of detecting operator incapacitation/vigilance that does not rely on relatively complex technology and that does not result in inordinate numbers of false-negative detections. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system to detect the positioning of a person relative to a seat includes an image sensor and a processing system. The image sensor is directed toward the seat and is configured to capture images of the person and the seat and to supply image data indicative of the captured images. The processing system is in operable communication with the image sensor. The processing system is configured to receive and process the image data to determine when the image sensor is not focused on the person for a first predetermined time period.

In another embodiment, a system to detect the positioning of a person relative to a seat includes a plurality of objects disposed on the seat in a predetermined pattern, an image sensor, and a processing system. The image sensor is directed toward the seat and is configured to capture images of the person and the seat and to supply image data indicative of the captured images. The processing system is in operable communication with the image sensor. The processing system is configured to receive and process the image data to determine that the person is not in a first position in the seat for a first predetermined time period based on which of the plurality of objects are visible in the captured images.

In yet another embodiment, a system to detect the positioning of a person relative to a seat includes a plurality of illuminators, an image sensor, and a processing system. The illuminators are configured to emit light, in a predetermined illumination pattern, onto the person. The image sensor is directed toward the seat and is configured to capture images of the person and the illumination pattern and to supply image data indicative of the captured images. The processing system is in operable communication with the image sensor. The processing system is configured to receive and process the image data to sense variations in the illumination pattern emitted onto the person.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
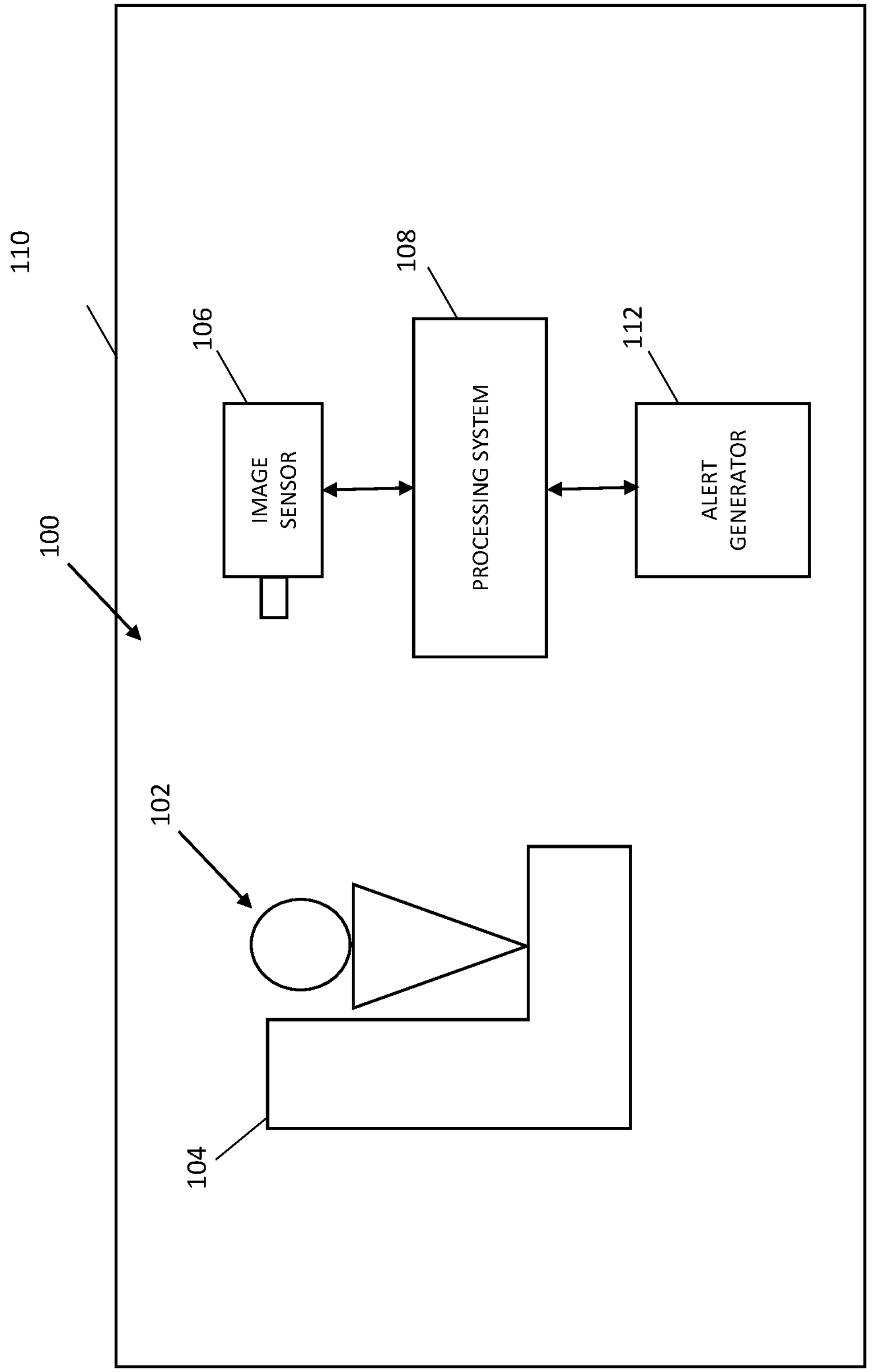
FIG. 1 depicts a functional block diagram of one example embodiment of a system to detect the positioning of a person relative to a seat.

Referring to FIG. 1, one embodiment of a system 100 to detect the positioning of a person 102 relative to a seat 104 is depicted and includes an image sensor 106 and a processing system 108. It should be noted that the system 100 may be disposed within any one of numerous environments, such as a vehicle, an aircraft, a machine, or an industrial facility. In the depicted embodiment, the specific environment is an aircraft, and more specifically a cockpit 110 of an aircraft.

Regardless of the specific environment, it is seen that the image sensor 106 is directed toward the seat 104 and is thus configured to capture images of both the person 102 and the seat 104, and to supply image data indicative of the captured images. It will be appreciated that the image sensor 106 may be implemented using any one of numerous types of image sensors now known or developed in the future. In one embodiment, the image sensor 106 is a camera, which may be a variable-focus camera or a fixed-focus camera.

No matter how the image sensor 104 is specifically implemented, it is in operable communication with the processing system 108. The processing system 108 may include one or more processors and computer-readable storage devices or media encoded with programming instructions for configuring the processing system 108. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the one or more processors.

The processing system 108 is configured to receive and process the image data supplied from the image sensor 106 to determine when the image sensor 106 is not focused on the person 102 for a predetermined time. It will be appreciated that the predetermined time period may vary and may depend, for example, on the specific environment. In one embodiment, the predetermined time period may be in a range of about 2 seconds to about 30 seconds depending, for example, on the vehicle context.

Regardless of the specific predetermined time period, the processing system 108 may make this determination using any one of numerous techniques. In one embodiment, it does so by establishing and storing, in the computer readable storage devices, a nominal image that corresponds to an image that was captured when the image is focused on the person 102. The processing system 108 then determines that the image sensor 106 is not focused on the person 102 by comparing subsequently captured images to the nominal image.

Figure 3:
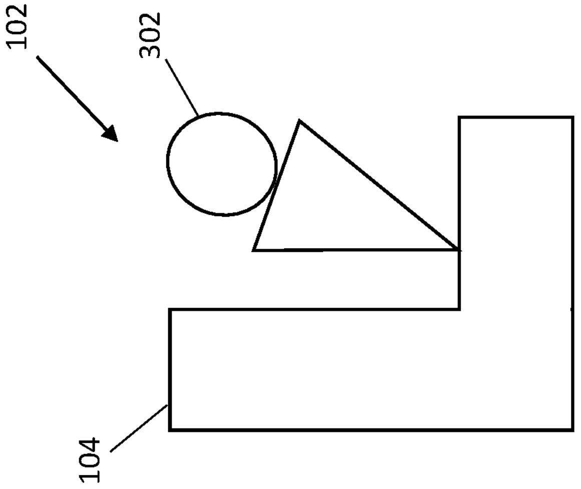
FIGS. 2-5 depict a person in various positions in a seat.
Figure 2:
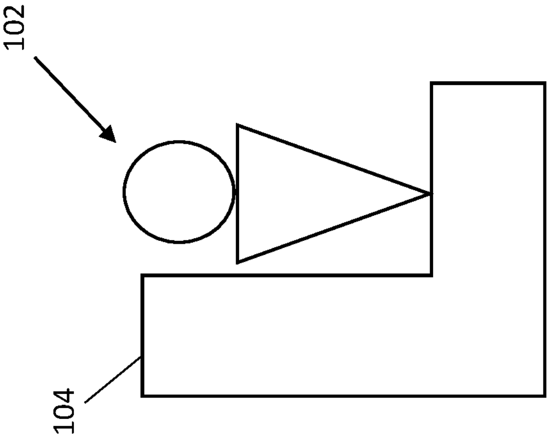
Figure 5:
Figure 4:
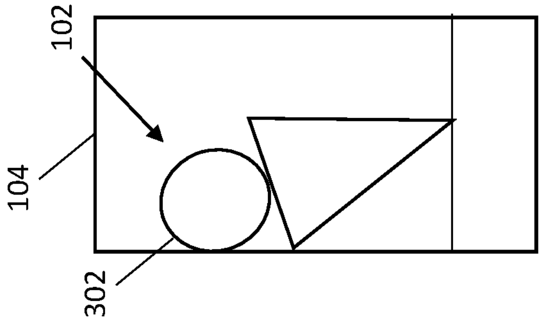

To illustrate the above, reference should be made to FIGS. 2-5, which depict the person 102 in various positions in the seat 104. In FIG. 2, the person 102 is shown sitting in the seat in a normal, alert sitting position (i.e., a first position). Of course, this "normal, alert" sitting position may vary from person-to-person. In FIG. 3, the person's head 302 is closer to the image sensor 106 (i.e., not in the first position), and thus the image sensor 106 is not focused on the person 102, for at least the predetermined time period. This may indicate, for example, that the person 102 has slumped forward due to, for example, the person 102 being asleep or otherwise incapacitated. In FIG. 4, the person's head 302 has moved to one side of the seat 104 for at least the predetermined time period, and thus the image sensor 106 is focused more on the seat 104. This may indicate, for example, that the person 102 has moved toward that side of the seat 104 also due to, for example, the person 102 being asleep or otherwise incapacitated. In FIG. 5, the person 102 is not even in the seat 104, indicating that they voluntarily left the seat 104 or fell out of the seat 104.

In addition to the above, the processing system 108 may also be configured to determine when the person 102 is moving out of, and back into, the first position a predetermined number of times during a second predetermined time period. When this occurs, it may indicate that the person 102 is experiencing, for example, some type of seizure event. It will be appreciated that the predetermined number of times and the second predetermined time period may vary and may depend, for example, on the person and on the vehicle context.

The processing system 108, in addition to determining that image sensor 106 is not focused on the person 106, is configured to generate an alert signal when this determination is made. Thus, as FIG. 1 further depicts, the system 100 may additionally include an alert generator 112. The alert generator 112, when included, is coupled to receive the alert signal from the processing system 108 and is configured, upon receipt of the alert signal, to generate an alert. It will be appreciated that the alert generator 112 may be variously configured and implemented, and that the alert that is generated may vary. For example, the alert generator 112 may be configured to generate an audible alert, a visual alert, a haptic alert, or any combination of these types of alerts.

Figure 6:
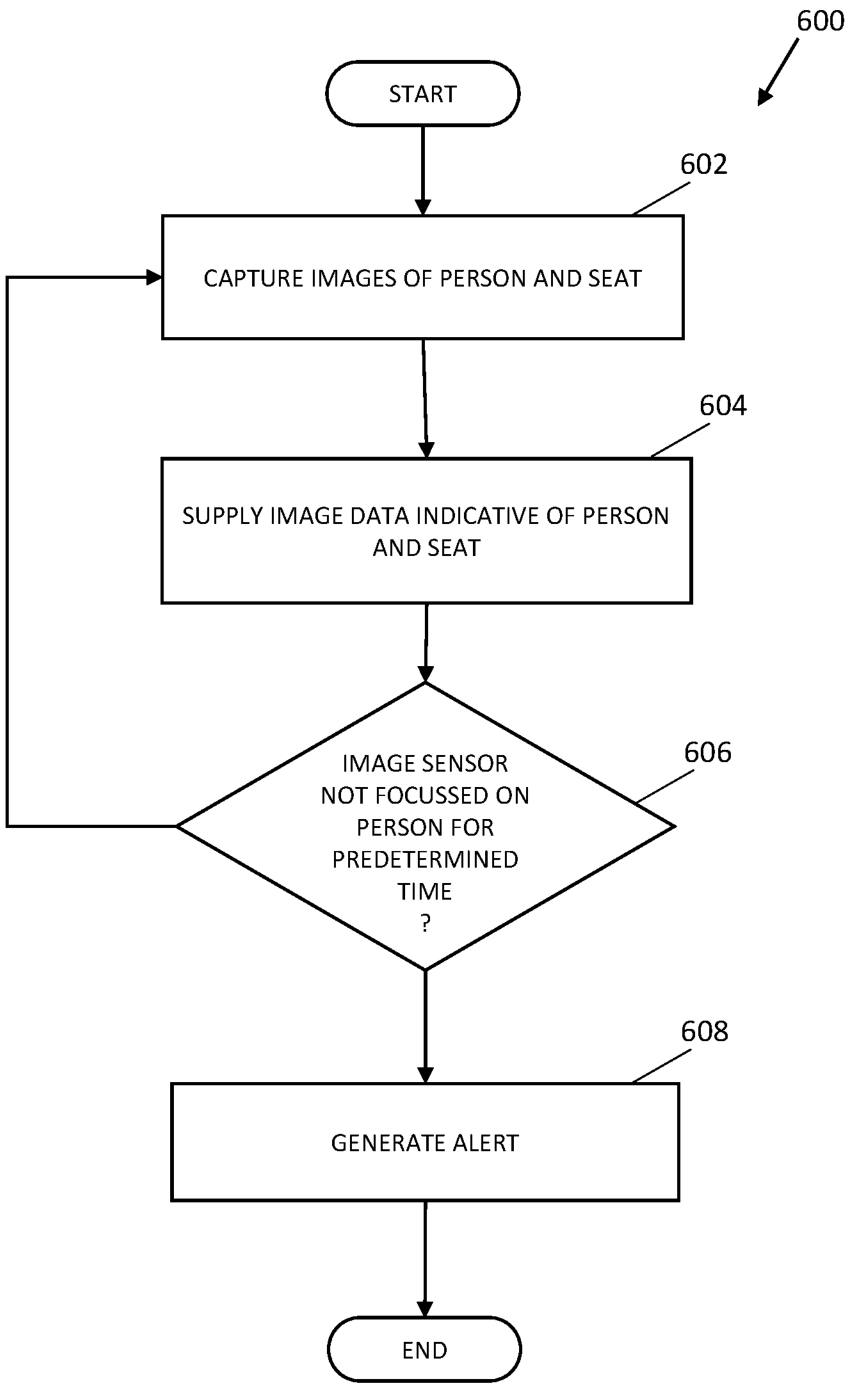
FIG. 6 depicts a process, in flowchart form, that may be implemented in the system of FIG. 1.

Referring now to FIG. 6, a process flowchart is depicted of one example process 600 for detecting the positioning of the person 102 relative to the seat 104. The order of operation within the process 600 is not limited to the sequential execution as illustrated in the figure, but may be performed in one or more varying orders as applicable and in accordance with the present disclosure.

The example process 600, which may be implemented using the image sensor 106 and within the processing system 108, includes capturing images, using the image sensor 106, of the person 102 and the seat 104 (602) and supplying image data indicative of the captured images to the processing system (604). The image data is processed, in the processing system 108, to determine when the image sensor 106 is not focused on the person 102 for a predetermined time (606). In the depicted process, an alert is generated (608) when the image sensor 106 is not focused on the person 102 for the predetermined time, otherwise the process 600 repeats.

Figure 7:
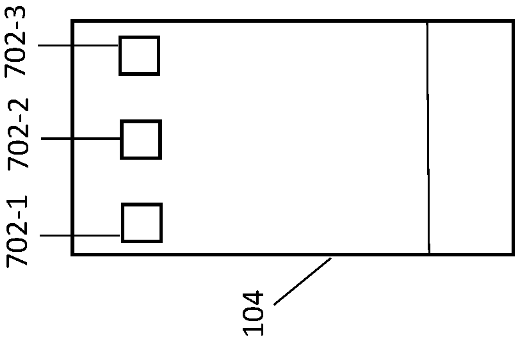
FIG. 7 depicts a seat having a plurality of objects disposed thereon in a predetermined pattern.

Turning now to FIG. 7, to further improve the confidence in determining the condition of the person 102 in the seat 104, the system 100 may additionally (or in some instances instead) include a plurality of objects 702 disposed on the seat 104 in a predetermined pattern. It will be appreciated that the objects 702 and the specific pattern and number of objects may vary. For example, the objects 702 may be either permanently embedded in, or temporarily applied to, the seat 104, and may be made of fabric or any one of numerous suitable materials, such as a reflective material. In the embodiment depicted in FIG. 7, three objects 702 (e.g., 702-1, 702-2, 702-3) are placed in a row on the seat 104, behind where the person's head 302 may be positioned. It will be appreciated that the objects 702 themselves may also have specific patterns disposed thereon. For example, the objects 702 may be implemented as black-on-white squares, circles, or crosses. In any case, when the objects 702 are included, the processing system 108 is further configured to process the image data to determine that the person 102 is not in the first position based on which of the plurality of objects 702 are visible in the captured images.

Figure 10:
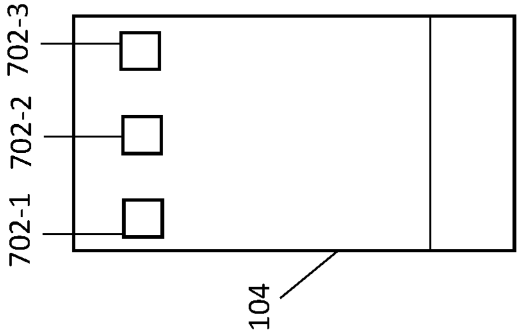
FIGS. 8-10 depict a person in various positions in the seat of FIG. 7.
Figure 9:
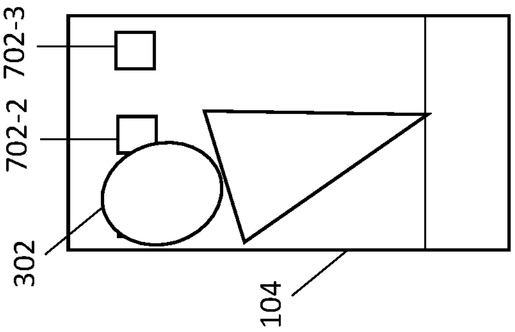
Figure 8:
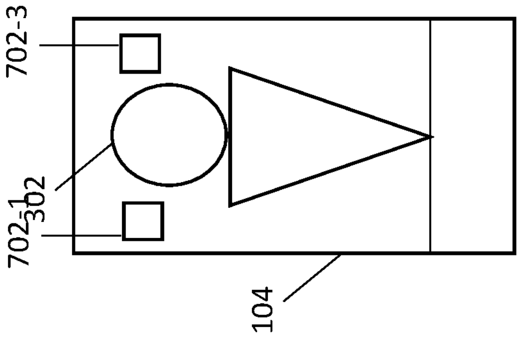

For example, in FIG. 8, the person 102 is shown sitting in the seat in the normal, alert sitting position (i.e., the first position) and the object 702-2 directly behind the person's head 302 is not visible in the image, whereas the other two objects 702-1, 702-3 are visible. In FIG. 9, the person's head 302 has moved to one side of the seat 104 for at least the predetermined time period, and the object 702-1 directly behind the person's head 302 is not visible in the image, whereas the other two objects 702-2, 702-3 are visible. As noted above, his may indicate, for example, that the person 102 has moved toward that side of the seat 104 due to, for example, the person 102 being asleep or otherwise incapacitated. In FIG. 10, all three objects 702-1, 702-2, 702-3 are visible, indicating that the person 102 is not even in the seat 104, either because they voluntarily left the seat 104 or fell out of the seat 104.

Figure 11:
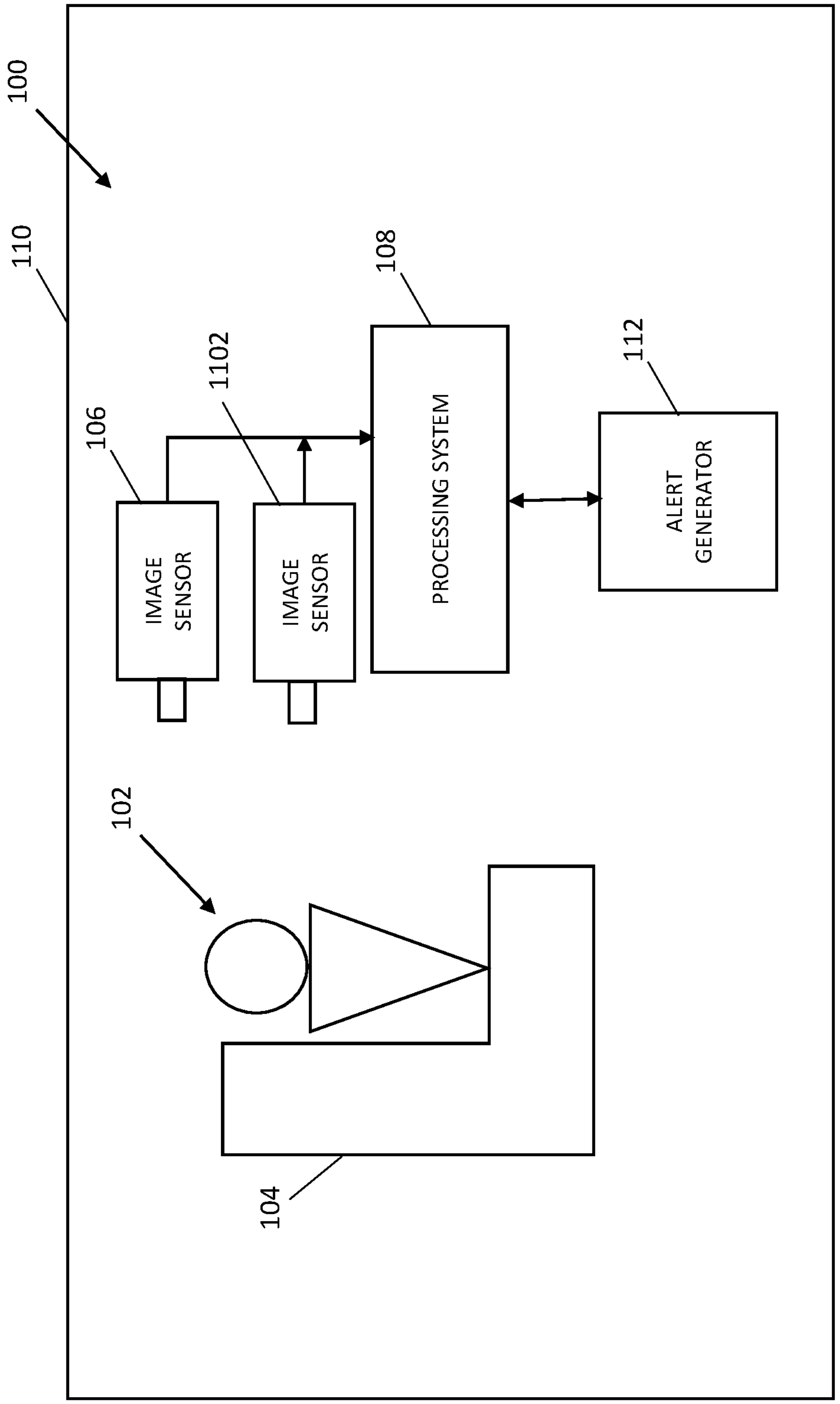
FIG. 11 depicts a functional block diagram of another example embodiment of a system to detect the positioning of a person relative to a seat.

Referring now to FIG. 11, it is seen that the system 100 may additionally, at least in some embodiments, include a second image sensor 1102. The second image sensor 1102, when included, is also configured to capture images of the person 102 and the seat 104 and to supply second image data indicative of the captured images. In this embodiment, the processing system 108, which is also in operable communication with the second image sensor 1102, is further configured to receive and process the second image data to determine when the person 102 is not in the first position for the predetermined time.

Figure 12:
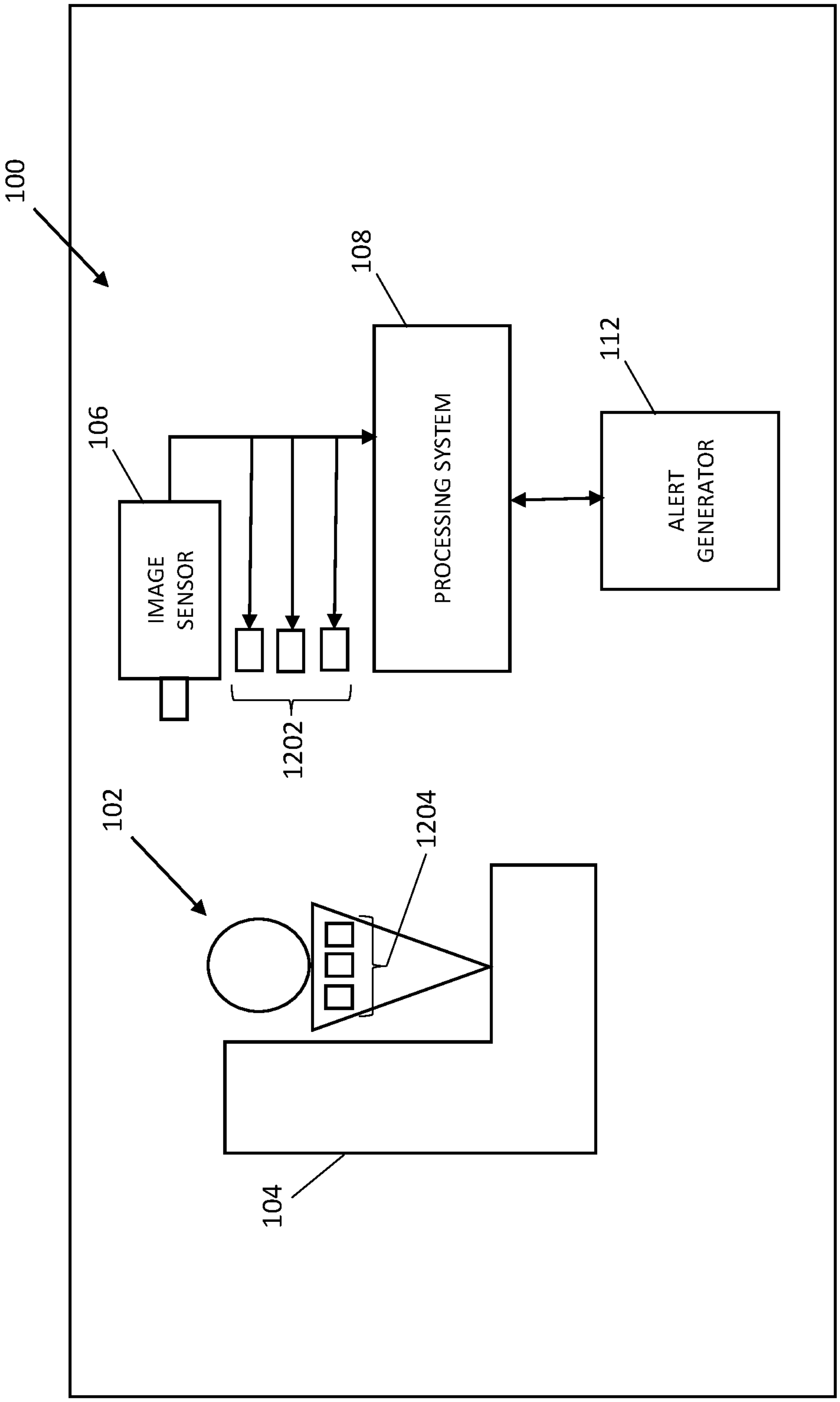
FIG. 12 depicts a functional block diagram of yet another example embodiment of a system to detect the positioning of a person relative to a seat.

In yet another embodiment, which is depicted in FIG. 12, the system 100 includes a plurality of illuminators 1202. The illuminators 1202 are disposed and configured to emit light, in a predetermined illumination pattern 1204, onto the person 102. As with the embodiment that includes the plurality of objects 702 disposed on the seat 104, it will be appreciated that the number of illuminators 1202 and the specific illumination pattern 1204 may vary.

In this embodiment, the image sensor(s) 106 is directed toward the seat 104 and is configured to capture images of the person 102 and the illumination pattern 1204 and to supply image data indicative of the captured images. The processing system 108, which is in operable communication with the image sensor(s) 106, receives and processes the image data to sense variations in the illumination pattern 1204 emitted onto the person 102. In this way, the processing system 108 detects the positioning of the person 102 relative to the seat 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system to detect the positioning of a pilot relative to a seat in an aircraft, comprising:

an image sensor mounted in the aircraft and directed toward the seat, the image sensor configured to capture images of the pilot and the seat and to supply image data indicative of the captured images;

a processing system mounted in the aircraft and in operable communication with the image sensor, the processing system configured to receive and automatically process the image data to (i) determine when the image sensor is not focused on the pilot for a first predetermined time period thereby indicating that the pilot is incapacitated or at least not sufficiently vigilant and (ii) generate an alert signal when the image sensor is not focused on the pilot for the first predetermined time; and an alert generator mounted in the aircraft and coupled to receive the alert signal from the processing system and configured, upon receipt thereof, to generate one or more of an audible, visual, and haptic alert to thereby alert the pilot or other persons that the pilot is incapacitated or at least not sufficiently vigilant.

2. The system of claim 1, wherein the processing system is further configured to:

establish and store a nominal image that corresponds to an image that was captured when the image is focused on the pilot; and process the image data to determine that the image is not focused on the pilot by comparing subsequently captured images to the nominal image.

3. The system of claim 1, further comprising:

a plurality of objects disposed on the seat in a predetermined pattern, wherein the processing system is configured to process the image data to determine that the pilot is not in a first position based on which of the plurality of objects are visible in the captured images.

4. The system of claim 1, wherein the processing system is further configured to determine when the pilot is moving out of, and back into, a first position a predetermined number of times during a second predetermined time period.

5. The system of claim 1, further comprising:

a second image sensor configured to capture images of the pilot and the seat and to supply second image data indicative of the captured images, wherein the processing system is in operable communication with the second image sensor and is further configured to receive and process the second image data to determine when the pilot is not in a first position for the first predetermined time period.

6. The system of claim 1, wherein the processing system is further configured to determine when the pilot is moving out of, and back into, the first position a predetermined number of times during a second predetermined time period.

7. A system to detect the positioning of a pilot relative to a seat in an aircraft, comprising:

a plurality of objects disposed on the seat in a predetermined pattern;

an image sensor mounted in the aircraft and directed toward the seat, the image sensor configured to capture images of the pilot and the seat and to supply image data indicative of the captured images; and a processing system mounted in the aircraft and in operable communication with the image sensor, the processing system configured to receive and automatically process the image data to determine that the pilot is not in a first position in the seat for a first predetermined time period based on which of the plurality of objects are visible in the captured images thereby indicating that the pilot is incapacitated or at least not sufficiently vigilant and (ii) generate an alert signal when the image sensor is not focused on the pilot for the first predetermined time; and an alert generator mounted in the aircraft and coupled to receive the alert signal from the processing system and configured, upon receipt thereof, to generate one or more of an audible, visual, and haptic alert to thereby alert the pilot or other persons that the pilot is incapacitated or at least not sufficiently vigilant.

8. The system of claim 7, wherein the processing system is further configured to receive and process the image data to determine when the image sensor is not focused on the pilot for the first predetermined time period.

9. The system of claim 8, wherein the processing system is further configured to:

establish and store a nominal image that corresponds to an image that was captured when the image is focused on the pilot; and process the image data to determine that the image is not focused on the pilot by comparing subsequently captured images to the nominal image.

10. The system of claim 7, further comprising:

a second image sensor configured to capture images of the pilot and the seat and to supply second image data indicative of the captured images, wherein the processing system is in operable communication with the second image sensor and is further configured to receive and process the second image data to determine when the pilot is not in the first position for the first predetermined time period.

11. A system to detect the positioning of a pilot relative to a seat in an aircraft, comprising:

a plurality of illuminators mounted in the aircraft and configured to emit light, in a predetermined illumination pattern, onto the pilot;

an image sensor mounted in the aircraft and directed toward the seat, the image sensor configured to capture images of the pilot and the illumination pattern and to supply image data indicative of the captured images;

a processing system mounted in the aircraft and in operable communication with the image sensor, the processing system configured to receive and automatically process the image data to sense variations in the illumination pattern emitted onto the pilot thereby indicating that the pilot is incapacitated or at least not sufficiently vigilant and (ii) generate an alert signal when the image sensor is not focused on the pilot for the first predetermined time; and an alert generator mounted in the aircraft and coupled to receive the alert signal from the processing system and configured, upon receipt thereof, to generate one or more of an audible, visual, and haptic alert to thereby alert the pilot or other persons that the pilot is incapacitated or at least not sufficiently vigilant.

* * * * *